March 14, 1961  B. H. BALDRIDGE  2,974,674
BOOSTER RELAY FOR PNEUMATIC CONTROL SYSTEMS
Filed April 12, 1957  4 Sheets-Sheet 1

INVENTOR.
BRUCE H. BALDRIDGE
BY
ATTORNEY

March 14, 1961  B. H. BALDRIDGE  2,974,674
BOOSTER RELAY FOR PNEUMATIC CONTROL SYSTEMS
Filed April 12, 1957  4 Sheets-Sheet 2

INVENTOR.
BRUCE H. BALDRIDGE
BY
ATTORNEY

March 14, 1961

B. H. BALDRIDGE 2,974,674

BOOSTER RELAY FOR PNEUMATIC CONTROL SYSTEMS

Filed April 12, 1957

INVENTOR.
BRUCE H. BALDRIDGE,
BY Arthur L Wade
ATTORNEY

INVENTOR.
BRUCE H. BALDRIDGE

United States Patent Office 2,974,674
Patented Mar. 14, 1961

2,974,674

BOOSTER RELAY FOR PNEUMATIC CONTROL SYSTEMS

Bruce H. Baldridge, Euclid, Ohio, assignor to Bailey Meter Company, a corporation of Delaware Filed Apr. 12, 1957, Ser. No. 652,477

11 Claims. (Cl. 137—85)

This invention relates to systems and apparatus for indicating, recording, or otherwise exhibiting and/or controlling the value of a position, measurement or variable. More particularly, the invention relates to such systems wherein a fluid pressure is established representative of that which is to be measured or controlled, and then the fluid pressure is used to actuate an exhibiting or controlling device.

While not necessarily so limited, the invention is particularly adapted and useful in pneumatic telemetering systems with air under pressure as the active motive fluid. The description of this specification is directed to apparatus employing pressure air, by way of example only.

In accordance with the invention, a pneumatic loading pressure is established corresponding to, or representative of, the value of the position, measurement or variable, to remotely exhibit the magnitude of the loading pressure or use the loading pressure for control purposes.

The invention is particularly adapted to the telemetering of a value to an adjacent or remote point; or for amplifying the power of a responsive device, such as a diaphragm, flow meter, or the like, so that an exhibiting or controlling device may be accurately positioned.

A particular object of the invention is to provide a pneumatically operated power amplifier whereby the available power of the responsive device, such as a diaphragm, for positioning an exhibiting means or performing other useful work, is increased.

Another object is to provide apparatus whereby a relatively weak force representative of the variable value, condition, or position is amplified in translation into a pneumatic or similar fluid pressure and the amplified fluid pressure is made available for actuating the exhibiting or controlling apparatus relatively adjacent or relatively remote from the measuring means. In this way a sensitive measuring instrument may be located adjacent the point of measurement and the resulting measurement may be amplified and transmitted over considerable distances to a desirable location for exhibiting or controlling apparatus. By transmitting the measurement through the agency of a pneumatic loading pressure, there is avoided the many inaccuracies and time lags which have been experienced in the past with systems wherein the measuring instrument itself must of necessity be located on a panel board a considerable distance from the location of the variable which is to be measured.

It will be apparent as the description proceeds that the invention may be put to a wide variety of uses such as for exhibiting the value of a temperature, pressure, relative humidity, electromotive force, or for transmitting commands or other intelligence, all of which are to be considered as coming within the scope of the invention.

It is a particular object of the present invention to provide system and apparatus wherein a substantially standardized type of transmitter is located at the point where the variable is to be measured and establishes a pneumatic pressure thereafter transmitted to a central location and utilized in terms of the variable being measured. In other words, regardless of the nature of the value of the variable being transmitted, it is converted at the point of measurement to be within a predetermined, relatively low, pneumatic pressure range which may be readily transmited over considerable distances to a central point of use. This standardization reduces the problem of transmitting pressures or other difficult values over considerable distances.

A further object is to provide a telemeter transmitter of universal applicability wherein variables, positions, and the like are converted to within the standard range of air pressure for remote or local telemetering.

An additional object is the provision of a fluid pressure amplifier for the telemeter transmitter which will have a high gain at relatively slow changes of the variable to which the transmitter responds and low gain at relatively fast changes of the variable.

An additional object is to provide an amplifier, or booster, with variable gain and a reset characteristic.

General system

Figure 1:
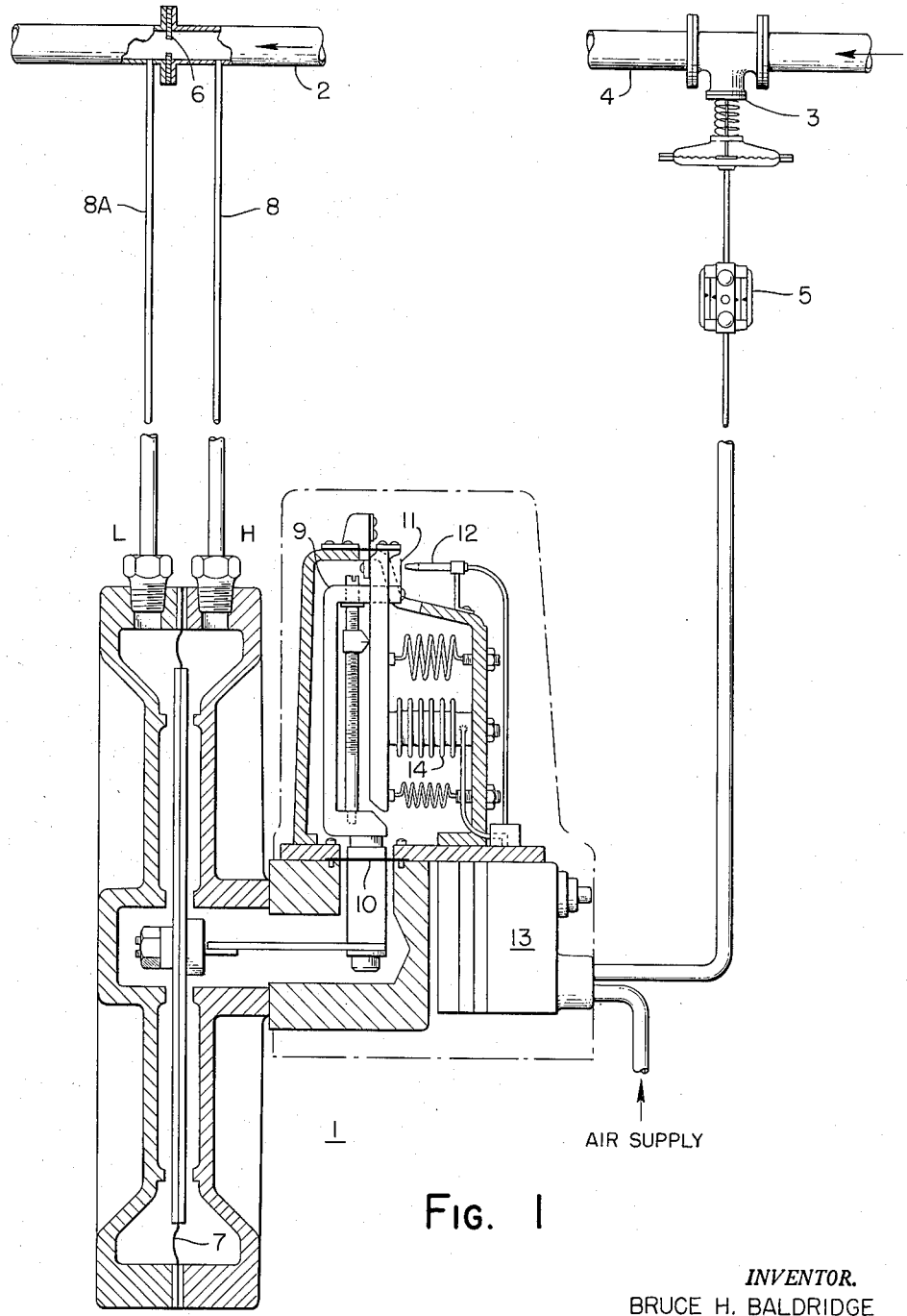
Fig. 1 illustrates an embodiment of the invention in a simple control system.

Referring to Fig. 1, a pneumatic telemetering system is disclosed as comprised of a transmitter, a selector station and a controller included in an operative fluid control system. The transmitter 1 is desirably located adjacent the point of measurement, in this case close to a fluid flow conduit 2 in which the value of the fluid flow is desirably to be measured and telemetered to a remote location. Under the control of transmitter 1 is a diaphragm-actuated fluid control valve 3 for controlling the rate of flow of the fluid through a conduit 4. The conduit 4 may be in the same system as the conduit 2 or in a different system.

Intermediate the transmitter 1 and the control valve 3 is a selector station 5 which may be desirably located at a control panel remote from the transmitter and from the control valve 3. It is preferably of the type disclosed and claimed in Paul S. Dickey et al. 2,729,222. This pneumatic selector station provides the possibility of having the control valve 3 automatically positioned under the dominance of transmitter 1, or, selectively, to disconnect the transmitter and allow remote hand-positioning of the valve 3.

Particular features of the present invention are shown in conjunction with transmitter 1. The remaining figures of the drawings are devoted to constructional arrangements and details of the amplifier of transmitter 1. Fig. 1 is included as explanatory of a simple control system in which a transmitter using such an amplifier finds its greatest usefulness. While the amplifier, and other features of the present invention, will be described in connection with the transmitter 1 it will be understood that they are applicable to other devices such as relays and the like in fluid pressure control or measuring systems.

While transmitter 1 is specifically illustrated and described as being sensitive to the flow of the fluid within the conduit 2, for establishing a fluid loading pressure within a range of 3–27 p.s.i., it will be understood that the transmitter may be sensitive to temperature, position or any other variable which may be converted into the 3-27 p.s.i. range for remote or local indication, recordation or use in control. It is to be understood that some other pressure range might have been selected. It is important, initially, to appreciate that the transmitter 1 is sensitive to a wide variety of variables such as flow, pressure, temperature and the like for converting the same into a standardized telemetering fluid pressure.

The flow within the conduit 2 is sensed by means of a pressure differential across orifice 6 located in conduit 2. This pressure differential is conveyed to opposite sides of the diaphragm means 7 of transmitter 1 by pipes 8 and 8A. Transmitter 1 of Fig. 1 includes a schematic showing of a force balance transmitter. Movement of diaphragm 7, due to variations in pressure differential, is conveyed to one end of a force beam 9. Beam 9 passes through a sealing means such as a diaphragm 10, which in adidtion to sealing the high pressure chamber of the diaphragm means 7, acts also as a fulcrum for beam 9. The opposite end of beam 9 carries a flapper 11, which in cooperation with nozzle 12 forms a fluid couple. Nozzle 12 is rigidly fastened to a housing portion of the force balance transmitter and is connected by a pipe to amplifier 13.

In general, amplifier 13 is supplied air under pressure and its pressure output is conveyed to a beam-restoring means, represented by bellows 14. This fluid pressure output may also be conveyed to an indicating means, represented by a gage of selector station 5 and/or to a controller as represented by valve 3. The general objectives of the invention are served by the establishment of the fluid pressure differentials between pipes 8 and 8A, transduction of these differentials into a mechanical force by diaphragm 7, transduction of this force into a fluid pressure by couple 11—12 and amplification of this couple output into a predtermined range of fluid pressures for manifestation on station 5 and/or control of valve 3. Other objectives of the invention are served by the amplifier-booster 13 in functioning to produce an output of gain, dependent upon the rate of change of its input from the couple 11—12.

*Schematic of the amplifier-booster*

Figure 2:
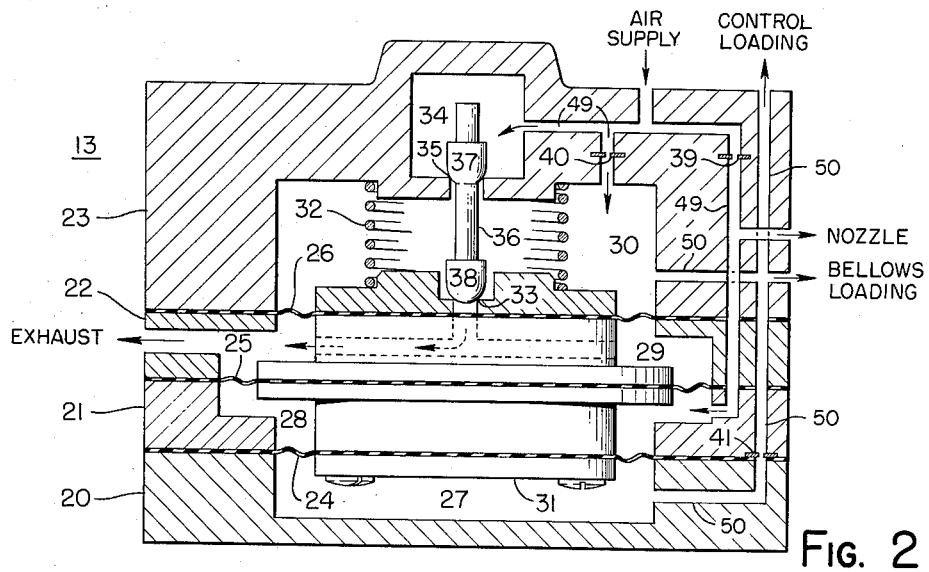
Fig. 2 is a sectioned elevation of an amplifying relay embodying the invention.
Figure 3:
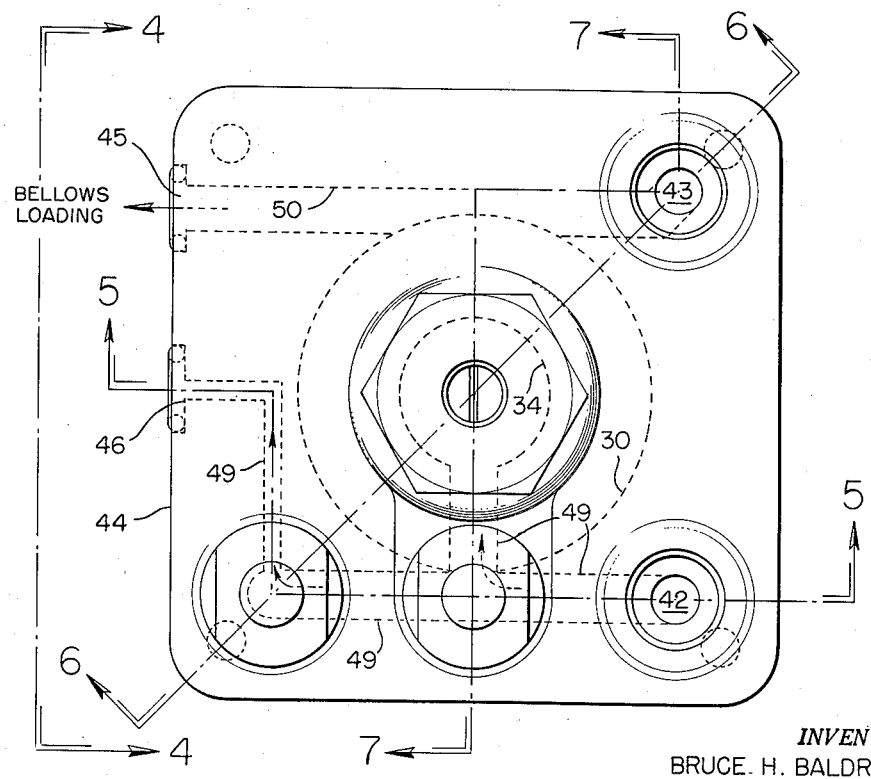
Fig. 3 is a side elevation of the amplifier selected to illustrate the supply pressure inlet and loading pressure output.
Figure 4:
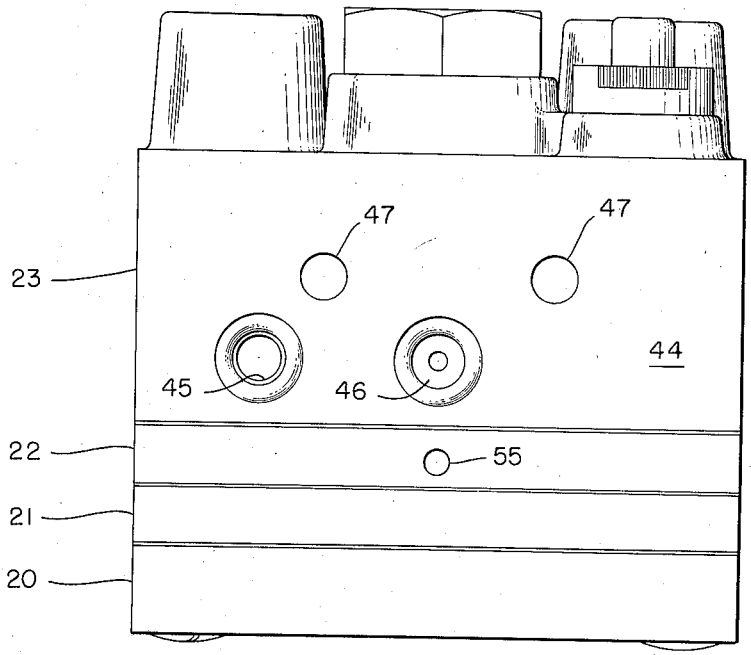
Fig. 4 is a plan view of the amplifier selected to illustrate its mounting surface.

Fig. 2 is a sectioned elevation of the amplifier of Fig. 1, given a simple schematic arrangement for purposes of illustrating its function and the basic relationship between its parts. The complete unit has been designated 13. The basic physical configuration of this unit is formed in the housing, formed into a shell, or casing, by four parts bolted together to form a central cavity. These four parts are designated 20, 21, 22, 23 to maintain orientation of understanding.

The four casing parts 20-23 capture diaphragms 24, 25, 26. The result is the formation of chambers 27, 28, 29, 30 from the central cavity. The diaphragms move together because they are clamped at their centers by a multiportion body 31. As a unit, body 31 is urged in one direction by spring 32 in chamber 30. The force of spring 32 and the force developed in chamber 30 are opposed by the forces developed in chambers 27 and 28 in moving body 31.

The upper two portions of body 31 have passages, as indicated, to form an atmosphere exhaust for chamber 30 through chamber 29. Seat 33 of the passage structure is valved for this exhaust function.

In order to develop the required output pressure of the booster, chamber 30 is valved to a standard source of air supply which need not be shown. It is sufficient to indicate that this supply is placed in cavity 34 of the casing part 23 and valved through seat 35 into chamber 30.

The valving of seats 33 and 35 is accomplished by valve stem 36 and lands 37 and 38 carried thereby. This valve assembly is moved by body 31, which results in seats 33 and 35 being alternately valved to develop or establish a loading pressure in chamber 30. As indicated supra, the forces of the pressures in chambers 27 and 28, when the pressure in 28 deviates from normal, acting against the forces of spring 32 and the pressure in chamber 30 determine the direction of deviation of pressure in chamber 30.

With the schematic arrangement of Fig. 2, it is demonstrated that the air supply source is not only placed in communication with cavity 34 but has a restricted connection with both chamber 30 and chamber 28. Specifically, the passages in the upper casing 23 to chambers 28, 30 are restricted to the air supply source by orifice 39 and orifice 40. By proper sizing of orifice 40, the supply pressure is continually bled to output pressure chamber 30 to provide dynamic seating of valve 36, 38 on seat 33. By dynamic seating is meant that regardless of the pressure developed in chamber 30, short of a value equal to the supply source, it is always elevated by the flow through orifice 40 to a finite amount above that required to permit land 38 and seat 33 to positively engage each other. Therefore, valve seat 33 continually "floats," ready to quickly change the value of the chamber 30 pressure when moved by body 31.

Orifice 39, between the air supply source and the nozzle 12-chamber 28 system gives a predetermined supply level to this system which is varied by the couple formed between nozzle 12 and flapper 11. Normal, or system balance, calls for a certain nozzle bleed-discharge. Variations of this pressure level in chamber 28 result from nozzle-flapper position variation and result in pressure change in chamber 30.

There remains to be considered the function of chamber 27. A fluid pressure is developed in this chamber which exerts a force on body 31 in the same direction as that of chamber 28. The fluid pressure force is developed from the output pressure of the booster in chamber 30. The passages disclosed demonstrate the connection between the controlled valve 3, the restoring bellows 14, chamber 27 and chamber 30. The connection is restricted to chamber 27 through orifice 41.

With orifice 41 restricting the connection between chamber 30 and chamber 27, reset action is introduced into the function of the amplifier as a unit. Consider the spring 32 to have a predetermined value of compression producing a force downward on body 31. Chamber 28 has a pressure value producing a force upward on body 31; this pressure is determined by the couple position. Chamber 30 develops its force downward and chamber 27 develops its force upward.

Due to the connection between 30 and 27 and the fact that these chambers are equal in effective area on body 31, the force of spring 32 and the force of chamber 28 must be equal to maintain balance, or a value within the range of the supply pressure will be established in chamber 30. Any change of the couple position will vary the pressure in chamber 28. Variation of chamber 28 pressure will move body 31 to valve chamber 30 to change the pressure in that chamber until bellows 14 restores the couple position, and, correspondingly, the pressure in chamber 28. Once the pressure of chamber 30 departs from the balance value, the restriction of orifice 41 causes the pressure of chamber 27 to lag and introduce the reset action. The reset action is produced by the fact that until the pressure of chamber 30 has been changed sufficiently to restore nozzle pressure chamber 28 value to its original magnitude, the force of chamber 28 on 31 will be sufficient to valve chamber 30 to the limit of the supply pressure. As the pressure of chamber 28 approaches its original value its valving of chamber 30 becomes less, permitting lagging chamber 27 to approach equality of pressure with chamber 30. The entire system comes to rest when the pressure of output chamber 30 has been reached which will restore the value of pressure in chamber 28 called for by the force of spring 32.

A further analysis of the function of amplifier-booster 13 is made from the observation that the speed with which the pressure in chamber 28 varies determines the relative gain of the unit; that is, the proportion between the changes of input to chamber 28 to output of chamber 30. This variation is brought about by the orifice 41 establishing the changing value of pressure in chamber 27 with respect to the chamber 30 from which it is developed and chamber 28 which causes the changes in both chambers 30 and 27.

A fast change of pressure value in chamber 28 produces a relatively small change in output chamber 30 because the bleed through orifice 41 does not have sufficient time to develop pressure in chamber 27 to assist in moving 31 for the valving of 30 to develop the output of high gain. Correspondingly, a slow change of pressure value in chamber 28 produces a relatively large change in output chamber 30 because the bleed through orifice 41 has sufficient time to develop pressure in chamber 27 to assist in moving 31 for the valving of 30 to develop the output of high gain.

General consideration of the problem

Force balance transmitters of the type generally shown in Fig. 1 are inherently very sensitive to changes in pressure differential across diaphragm 7, or any means developing the force to be telemetered. These transmitters have a very fast response and their force beam movement is relatively small. These general characteristics cause these transmitters to be rather unstable and subject to force beam oscillation. This of course, in a fluid telemetering system, produces undesirable results.

These force balance transmitters employ a common denominator of amplifying means. These amplifier-boosters are generally, while differing somewhat in their actual structure, of the proportional gain type. An illustration of this type is disclosed in Gorrie et al. 2,737,963.

When boosters of the proportional gain type are used in conjunction with force balance transmitters of conventional types, stabilization of the transmitter is generally achieved by providing the beam with some form of dampening force. Stabilization is achieved, of course, but the dampening means reduces the sensitivity and slows down the response of the transmitter to variables. In conceiving the present invention, a dynamic analysis made it evident that a booster having a low gain would tend to stabilize the force balance transmitter. However, use of low gain would force the acceptance of a relatively large geared range of flapper-nozzle movement. With a relatively large geared range of flapper-nozzle movement, the effects of heavy spring rates at the take-out seal resulted in nonlinear performance and loss in sensitivity. Theoretically, the solution lay in overcoming the undesirable characteristics by providing a high gain booster. The problem became one of supplying a booster with both high and low gain.

The provision of chamber 27, restricted in connection to chamber 30, provides the required function of variable gain in the manner previously described.

A practical embodiment of a booster built in accordance with this invention is shown in Figs. 3–7 inclusive. Figs. 3–7 indicate that the booster has a supply pressure inlet port 42 and a loading pressure outlet port 43 extending inwardly from one of its side surfaces. The top of the booster presents a mounting surface 44. Extending inwardly from surface 44 is a bellows loading pressure port 45 and a nozzle back pressure port 46. Holes 47 extending through the housing portion 23 are provided for mounting bolts.

Figure 5:
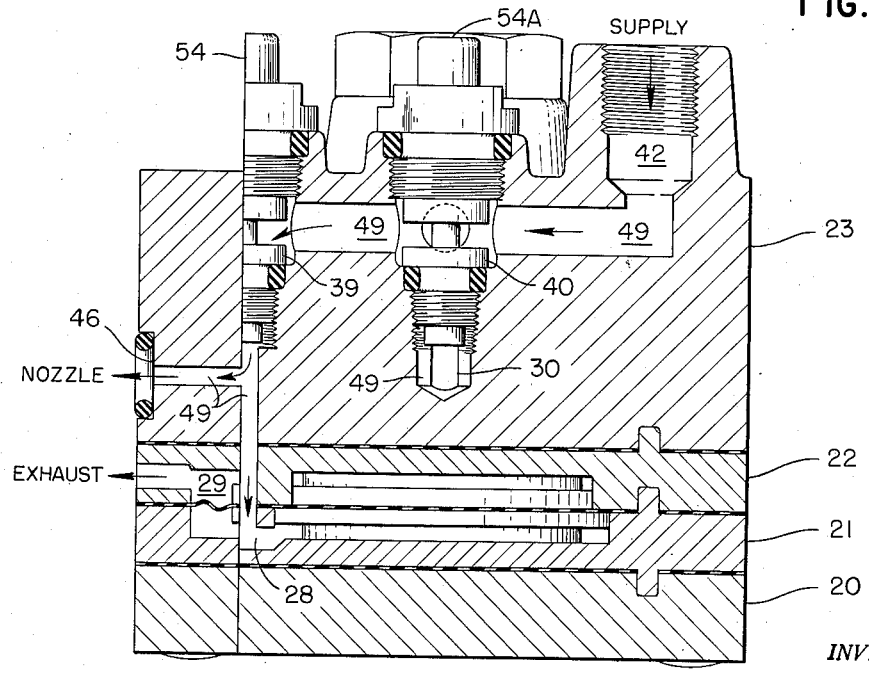
Fig. 5 is a sectioned elevation along line 5—5 of Fig. 3.
Figure 6:
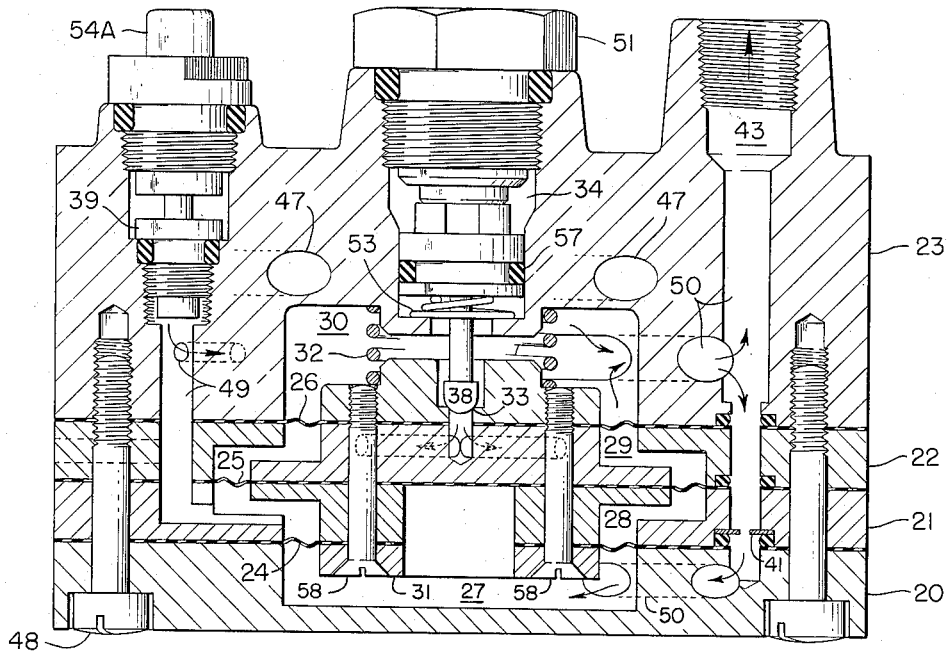
Fig. 6 is a sectioned elevation along line 6—6 of Fig. 3.
Figure 7:
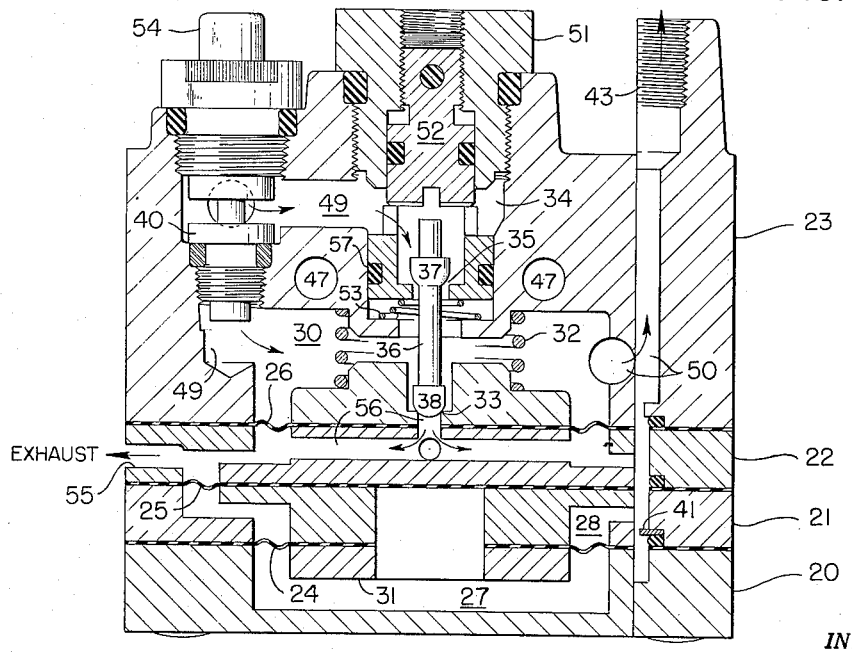
Fig. 7 is a sectioned elevation along line 7—7 of Fig. 3.

As best shown in Figs. 5, 6 and 7, the booster housing consists of four basic sections, a valve section 23, an exhaust section 22, a nozzle section 21 and a reset or cover section 20 held in assembled relationship by means of bolts 48.

Ports 42, 43, 45 and 46 are all located in section 23. Also housed therein is supply pressure cavity 34, loading pressure chamber 30, portions of passages 49 and 50, orifice means 39 and 40, spring 32, valve combination 36, 37 and 38, upper or inlet valve seat 35, valve cap 51, valve adjusting screw 52, inlet valve seat spring 53 and manual orifice cleanout means 54 and 54A for each of orifices 39 and 40 respectively. Passages 49 and 50 are each multibranched. Passages 49 connect supply port 42 with chambers 28, 30 and 34 and nozzle port 46. Passages 50 connect chamber 30 with chamber 27 and ports 43 and 45.

Exhaust section 22 contains exhaust chamber 29, exhaust passage 55 and portions of passages 49 and 50.

Nozzle section 21 contains the nozzle back pressure chamber 28, portions of passages 49 and 50 and orifice 41.

Cover 20 contains reset chamber 27 and a portion of passage 50.

Separating sections 20, 21, 22 and 23, and forming flexible wall portions of chambers 27, 28, 29 and 30, will be found diaphragms 24, 25 and 26. These diaphragms serve not only as flexible walls between chambers 27, 28, 29 and 30 but also as the gasket means between sections 20, 21, 22 and 23. The central portions of the diaphragms are clamped to a four part moving body 31. Bolts 58 maintain body 31 and diaphragms 24, 25 and 26 in assembled relationship. Portions of body 31 are thus suspended in chambers 27, 28, 29 and 30 and the assembly 31 is thus free to move up or down in these chambers under the influence of pressure changes within the chambers. A branched passage 56 in two of the sections of body 31 provides communication between chambers 29 and 30. A portion of passage 56 is enlarged and forms a seat 33 for valve 38 thus allowing said valve to control communication between chambers 30 and 29.

Inlet valve seat 35 is movably confined in a threaded and shouldered bore in housing section 23. A spring 53 tends to move said seat away from the shoulder and outwardly of the bore. An O ring seal 57 prevents leakage. Valve cap 51 is threaded into the outer portion of the bore housing valve seat 35. An O ring seal prevents leakage. A valve seat adjusting screw 52 threaded in cap 51 limits the outward movement of valve seat 35. Also threaded in bores of housing section 23 are orifice assemblies 39 and 40. Orifice 39 restricts the flow of inlet air supply to the nozzle 12 and to chamber 28. Orifice 40 restricts the flow to chamber 30. Each orifice means is supplied with a cleanout means 54A and 54 respectively.

Chambers 30 and 27 and the upper and lower portions of assembly 31 are sized to provide substantially equal effective pressure areas for diaphragms 24 and 26. The effective pressure area of diaphragm 25 is substantially double that of diaphragms 26 and 24. Spring 32 tends to balance out the effects of the larger effective area of diaphragm 25 when a normal nozzle back pressure exists in chamber 28.

Theoretically valve seat 35 should be adjusted so that when valves 37 and 38 tend to simultaneously seat, the position of assembly 31, relative to housing sections 20–23 is such that the effective areas of diaphragms 24 and 26 are identical, at which time the reset rate will be constant and the reset sensitivity at maximum.

The structure shown and described in Figs. 3–7 inclusive, as noted previously, represent a booster, made in accordance with the teachings of this invention. The actual representation of Figs. 3–7 will be found to be substantially in agreement with the schematic showing of Fig. 2.

The booster or amplifier 13 is a closed loop servo-mechanism hence the possibility of instability is present. As shown and described however, the booster has proven to be stable under all operating conditions. The device with which the amplifier is associated (transmitter, relay, controller, etc.) may oscillate or be unstable if the reset rate of the amplifier is too fast. The size of orifice 41 is thus an important factor in preventing oscillation and securing stability of the unit in which the booster is used. Orifice 41 can be made adjustable in which case a booster for universal use results or fixed orifices may be provided in which case the booster is limited to a specific usage.

Regardless of the size of orifice 41 however, all boosters provided therewith have the feature of high and low gain previously described. This feature produces a stabilizing effect in the unit in which it is used and in the case of the force balance transmitter 1, eliminates the need for damping means for beam 9. Transmitter 1 thus retains its inherent features of high sensitivity and fast response without sacrificing stability.

The reset feature of the booster, described in conjunction with orifice 41 and the equal effective pressure areas of body 31 in chambers 30 and 27 plus the positioning of seat 35, results in a booster having negligible hysteresis. This freedom from hysteresis is reflected in a further stabilizing of the unit of which the booster is a part.

By experimentation it has also been determined that the amplifier may be used in any position with no negligible differences in function, sensitivity or stability being observed. It has also been determined that ambient temperature changes in the usage of 40–140 F. do not appreciably effect the sensitivity or the stability of the booster. These two additional features facilitate the design and adaptation of units in which the booster or amplifier is incorporated.

What I claim as new, and desire to secure by Letters Patent of the United States, is:

1. In a fluid pressure control system, a booster relay for a nozzle and vane control couple, comprising, a first chamber having a first pressure sensitive movable wall, a combined supply and waste valve for admitting pressure to and exhausting pressure from said chamber mechanically positioned by said movable wall, a second chamber having a second pressure sensitive movable wall mechanically linked to the first pressure sensitive movable wall to oppose the first movable wall in positioning said supply and waste valve, a restricted connection between a source of pressure fluid and said second chamber, a connection between said second chamber and the control couple, a third chamber between the first and second chambers having as opposite sides the pressure sensitive movable walls of the first and second chambers, a passage controlled by the combined supply and waste valve connecting the first and third chambers, an exhaust passage from the third chamber to the atmosphere, a fourth chamber having a pressure sensitive movable wall in common with the second chamber mechanically linked to the first and second movable walls and a restricted connection between the first and fourth chambers.

2. The relay of claim 1 wherein a restricted by-pass is provided around the supply portion of the supply and waste valve.

3. The relay of claim 2 in which a spring is provided in the first chamber producing a force on the pressure sensitive movable wall thereof tending to open the exhaust portion and close the supply portion of the combined supply and waste valve.

4. The relay of claim 3 in which the seat of the inlet portion of the combined supply and waste valve is provided with position adjusting means externally of the first chamber.

5. In a pneumatic control system, a booster relay comprising a housing provided with a central cylindrical cavity having a central section of materially larger diameter than end sections of substantially equal diameter disposed on either side thereof, pressure sensitive diaphragms extending across each of said cavities thereby forming four pressure sensitive chambers separated by said pressure sensitive diaphragms, a multi-portioned body clamping all of said diaphragms whereby all of said diaphragms move axially in said cavity together, a helical spring disposed in a first one of said end chambers between said housing and one of said pressure sensitive diaphragms for urging said multi-portioned body in one direction, an inlet port axially aligned with said multi-portioned body in the end wall of said housing partially forming said first end chamber for admitting compressed air thereto, a coopearting exhaust port in said multi-portioned body axially aligned with said inlet port, a cylindrical valve stem axially movable by said multi-portioned body and having a first land cooperating with said inlet port to admit compressed air to said first chamber when said multi-portioned body axially moves in one direction from a neutral position and having a second land cooperating with said exhaust port for exhausting compressed air from said first end chamber when said multi-portioned body axially moves in the other direction from the neutral position.

6. The relay of claim 5 wherein a passageway in said housing is provided for connecting said inlet port to a source of compressed air and a restricted connection is provided between said passageway and said first end chamber.

7. The relay of claim 6 wherein a second restricted connection is provided between said passageway and another of said pressure chambers acting in opposition to said end chamber.

8. The relay of claim 7 wherein said second restricted connection is provided with a port for connection to a nozzle of a vane and nozzle control couple.

9. The relay of claim 8 wherein a third restricted passageway is provided in the housing between said first end chamber and the other end chamber acting in opposition thereto.

10. The relay of claim 9 wherein a port is provided into said first end chamber for connection to a bellows for relatively moving the vane and nozzle of a control couple.

11. The relay of claim 10 wherein a port is provided into said first end chamber for connection to a control element.

References Cited in the file of this patent

UNITED STATES PATENTS

| | | |
|---|---|---|
| 2,517,051 | Swenson | Aug. 1, 1950 |
| 2,575,085 | Alyea | Nov. 13, 1951 |
| 2,588,622 | Eckman | Mar. 11, 1952 |
| 2,638,922 | Caldwell | May 19, 1953 |
| 2,705,017 | Lewis | Mar. 29, 1955 |
| 2,711,754 | McKinney | June 28, 1955 |
| 2,712,321 | Grogan | July 5, 1955 |
| 2,714,895 | Rockwell | Aug. 9, 1955 |
| 2,737,973 | Kimmell | Mar. 13, 1956 |
| 2,773,506 | Bauer | Dec. 11, 1956 |
| 2,789,543 | Popowsky | Apr. 23, 1957 |
| 2,804,877 | Rosenberger | Sept. 3, 1957 |
| 2,808,725 | Booth et al. | Oct. 8, 1957 |